Patented Sept. 11, 1945

2,384,535

UNITED STATES PATENT OFFICE 2,384,535

BUTADIENE COPOLYMERS AND METHOD OF PREPARING SAME

David Craig, Cuyahoga Falls, Ohio, assignor to The B. F. Goodrich Company, New York, N. Y., a corporation of New York No Drawing. Application October 16, 1940, Serial No. 361,433

5 Claims. (Cl. 260—74)

This invention relates to new diene copolymers and to a method of preparing the same.

It is well known that aliphatic conjugated dienes such as butadiene, isoprene, dimethyl butadiene, piperylene and the like may be polymerized to elastic vulcanizable masses of the general nature of rubber. It is also well known that the properties of these diene synthetic rubber-like materials may be improved appreciably by copolymerizing the diene with one or more other compounds called comonomers which are capable of forming rubber-like copolymers with dienes. For example, a copolymer of butadiene and acrylonitrile possesses unusual oil resistance and is superior to simple diene polymers in regard to elasticity and tensile strength. Copolymerizing styrene with butadiene also produces a synthetic rubber of desirable properties. Other diene comonomers which have heretofore been proposed such as vinyl naphthalene, methyl methacrylate, vinylidene chloride and the like exert characteristic effects on the properties of copolymers made by copolymerizing dienes therewith.

I have now discovered that aryl olefins which contain halogen substituents in the aryl nucleus such as p-chloro styrene are capable of forming copolymers with conjugated diene hydrocarbons and, when copolymerized therewith, impart new and unexpected properties to the copolymers. Thus, I have found that copolymers of such dienes with halogen substituted aryl olefins are vastly superior to copolymers of dienes with unsubstituted aryl olefins in regard to mechanical properties such as tensile strength and ultimate elongation, and, moreover, are appreciably resistant to the swelling action of mineral and vegetable oils, a property not present to any marked degree in the copolymers of dienes with unsubstituted aryl olefins. These new copolymers are also plastic, coherent and somewhat tacky and may readily be worked on conventional rubber machinery. They also possess good resistance to chemicals such as acids and alkalies, to heat and to aging.

Accordingly, this invention comprises copolymerizing conjugated butadiene hydrocarbons such as butadiene-1,3, isoprene, 2,3-dimethyl butadiene-1,3, piperylene and the like, but preferably butadiene-1,3, with halogen substituted aryl olefins. By the term halogen substituted aryl olefin is meant an aromatic compound which contains one or more halogen atoms attached to nuclear carbon atoms and which also contains a polymerizable olefinic group

also directly connected to a nuclear carbon atom. Such compounds may be represented structurally by the formula

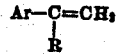

wherein Ar is a halogen substituted aryl radical and R is hydrogen or an alkyl group such as methyl or ethyl. Typical compounds in this class include p-chloro styrene, o-chloro styrene, p-bromo styrene, o-bromo styrene, 1-vinyl 2,4 di chloro benzene, p-chloro alpha methyl styrene, 1 vinyl 4 chloro naphthalene, 1 vinyl 2 chloro naphthalene and others. The preferred compounds are the chloro substituted vinyl benzenes and vinyl naphthalenes such as p-chloro styrene and 1-vinyl 4-chloro naphthalene.

These halogen substituted aryl olefins may be prepared in any of a number of ways such as by the dehydration of the appropriate aromatic alcohols, decarboxylation of appropriate aromatic acids or from hydrocarbon or halogenated hydrocarbon sources, the particular method of preparation being of not particular consequence in this invention. Mixtures of various halogen substituted aryl olefins such as, for example, the technical mixtures of o and p chloro styrene may be employed instead of the pure materials, if desired.

It is also within the scope of this invention to polymerize mixtures including not only one or more dienes and one or more halogen substituted aryl olefins but also other diene comonomers such as acrylonitrile, styrene, methyl methacrylate, vinylidene chloride and the like since the multipolymers thereby obtained are often of particular value in that the desirable properties imparted to the polymer by the various comonomers are combined in a single material.

It is generally true that in any copolymeric system the specific properties of the copolymer will vary with the relative proportions of the comonomers and with the method and conditions of polymerization. This is also the case with the copolymers of dienes and halogen substituted aryl olefins. For instance, the rubber-like properties of a butadiene, p chloro styrene copolymer such as elasticity and vulcanizability will be more pronounced when the copolymer contains at least about 50% by weight of butadiene. It is preferred, therefore, when a rubber-like polymer is desired as the product to use from about 50 to 80% by weight of the diene and from about 20 to 50% of the halogen substituted aryl olefin or of a mixture of comonomers including a halogen substituted aryl olefin. However, it is also within the purview of this invention to employ mixtures of dienes with halogen substituted aryl olefins in all proportions since copolymeric products having new and useful properties are obtained in each case.

Polymerization of the monomer mixture may be carried out in a homogeneous system or in aqueous emulsion or by any other method of forming polymers. If the homogeneous method of polymerization is used, the monomer mixture is heated at a temperature between room temperature and about 100° C., preferably in presence of a substance capable of accelerating the reaction such as a peroxide, either with or without the presence of a solvent for the reaction. When polymerization is complete, which usually requires several days by this method, the polymer is separated from unreacted monomers and/or solvent if these are present, and the massive material is then processed in the usual manner.

The most efficient and preferred method of polymerizing the monomer mixtures of this invention, however, is to carry out the reaction in an aqueous emulsion. In this case the mixture of monomers is emulsified with water by means of a suitable emulsifying agent, a polymerization accelerator or catalyst is preferably added together perhaps with other substances which activate the polymerization accelerator or which otherwise influence the polymerization in a desired manner, and the emulsion is allowed to polymerize by continuously agitating the same at a temperature of about 20-60° C. for a time sufficient to complete the reaction, usually from about 15 to 150 hours. The copolymer is obtained in form of an aqueous dispersion resembling natural rubber latex, to which an age resistor or antioxidant may be added, if desired, and which may then be utilized as such or coagulated by the same methods used to coagulate rubber latex, for example, by addition of acid, alcohol, or salts or by a combination of these methods. The polymerization products are washed and dried to produce a crude rubber-like material which may be processed in substantially the same manner as natural rubber.

A wide range of materials may be used in the above process to bring about emulsification of the monomer mixture with water. Ordinary soaps such as the sodium or potassium salts of saturated or unsaturated fatty acids, synthetic soap-like materials such as hymolal sulfates or sulfonates, aromatic sulfonates, and salts of high molecular weight aliphatic bases, for example, sodium lauryl sulfate, sodium naphthalene sulfonate, the hydrochloride of diethylaminoethyloleylamide and cetyltrimethylammonium methyl sulfate, and many other emulsifying agents are operable in this invention. A very effective emulsifying solution is one which contains a fatty acid such as myristic or palmitic acid which has been from about 70 to 95% neutralized with alkali.

An equally wide range of materials is available for selection of the polymerization accelerator to be employed in the emulsion polymerization process. Catalysts soluble in either the aqueous phase or the non-aqueous phase of the emulsion may be used. Among these are the peroxides such as hydrogen peroxide, diacyl peroxides and benzoyl peroxide, per salts such as alkali metal perborates, persulfates and percarbonates, di azo compounds such as diazo amino benzene and dipotassium diazomethane disulfonate and other compounds. Activators such as sodium pyrophosphate, sodium oxalate, acetanilide, urea, glycine, alanine, myristic acid and the like may be used in connection with the polymerization accelerator if desired. In some instances it may be desirable to add other ingredients to improve the properties of the copolymers or to modify the course of the polymerization. By proper selection of the ingredients going into the aqueous emulsion it is possible to speed up the polymerization and to vary the properties of the polymerization products.

In order to illustrate more clearly the manner in which this invention may be carried out, the following examples are cited but it is to be understood that many variations may be effected without departing from the scope of the invention.

*Example I*

Seventy parts by weight of butadiene and 30 parts by weight of p-chloro styrene are emulsified with 250 parts of a 2% aqueous solution of myristic acid which has been 85% neutralized with caustic soda. Ten parts of a 3½% solution of hydrogen peroxide, 0.7 part of sodium pyrophosphate and 0.3 part of ferric pyrophosphate are added to accelerate the polymerization. The emulsion is allowed to polymerize by agitation for 33 hours at a temperature of 40° C. Two parts of phenyl beta naphthylamine are added to the latex-like emulsion resulting from the polymerization and the emulsion is coagulated with a mixture of alcohol and salt. The coagulum obtained is a plastic, elastic, tacky material quite similar in appearance to pale crepe rubber. The yield of copolymer is quantitative. The rubber-like copolymer may be masticated without difficulty and may otherwise be processed in the same manner as natural rubber. When compounded in a typical tire tread recipe with sulfur, carbon black, stearic acid, zinc oxide, softener and accelerator, and vulcanized, excellent vulcanizates are obtained. For example, one such vulcanizate exhibits a tensile strength og 5100 lbs./sq. in. and an ultimate elongation of 730%, as compared with only a 4500 lbs./sq. in. tensile and a 650% elongation of a similarly prepared vulcanizate from a butadiene styrene copolymer. This vulcanizate is also resistant to swelling by mineral oils and gasoline while the vulcanizate from a butadiene styrene copolymer does not possess this valuable property.

*Example II*

An amulsion made up as follows:

Butadiene _____ parts_ 75
p-Chloro styrene _____ do___ 25
Emulsifying solution (2% aqueous myristic acid, 85% neutralized).
Diazoamino benzene_____ parts__ 15 is polymerized at a temperature of 30° C. for 39 hours. Treatment of the synthetic latex as in the previous example produces an 88% yield of a plastic copolymer. The copolymer is moderately soluble in benzene but is resistant to deterioration by dilute acids or alkalis or by corrosive chemicals. It is resistant to heat, sunlight and oxygen. Upon heating it becomes more plastic but does not lose its strength and elasticity.

*Example III*

Butadiene ------------------------------parts-- 70
1-vinyl 4-chloro naphthalene---------do----- 30 are polymerized as in Example I. A rubber-like copolymer is obtained in good yield.

*Example IV*

Butadiene ------------------------------parts-- 50
p-Chloro styrene --------------------do------ 20
Acrylonitrile ------------------------do------ 30 are polymerized as in Example I. A plastic oil-resistant copolymer which may be worked easily on the mill is obtained. When compounded and vulcanized exceptionally strong vulcanizates are produced.

As may readily be seen from the foregoing embodiments, copolymers of dienes and halogen substituted aryl olefins are unexpectedly superior to copolymers of dienes with unsubstituted aryl olefins since these copolymers possess improved tensile properties, are oil and chemical resistant and yet are readily plastic and easily worked, a combination of properties which is ordinarily difficult to obtain in a rubber-like material.

Since, as has been mentioned above, the particular characteristics of the copolymer depend upon the relative proportions of the comonomers and the method and conditions of polymerization, this invention includes a variety of products useful for a number of purposes. The products which are obtained by the copolymerization of monomer mixtures wherein the diene is present to the extent of 40-50% or more by weight are generally useful as rubber substitutes. They may be compounded with other materials such as other rubber-like or resinous products, pigments, plasticizers, vulcanizing ingredients, antioxidants, and the like and may be vulcanized as is natural rubber. Compounding and vulcanizing technique will obviously depend upon the particular vulcanized article to be produced.

Other products of this invention which result from the copolymerization of monomer mixtures wherein the halogen substituted aryl olefin is present to the extent of about 60% or more are tougher, more thermoplastic, and are more difficult to vulcanize. The rubber-like properties are not so pronounced but the unexpected superiority over the corresponding copolymers of unsubstituted aryl olefins and dienes is still maintained. These products are also useful for a number of purposes.

I claim:

1. The process which comprises polymerizing in aqueous emulsion a mixture of monomers including a conjugated butadiene hydrocarbon, a compound of the formula $$Ar-C=CH_2$$
$$\vert$$
$$R$$

wherein Ar is a chlorinated aryl radical and R is a member of the class consisting of hydrogen and alkyl, and acrylonitrile, said mixture containing at least 50% by weight of the conjugated butadiene hydrocarbon.

2. The process which comprises polymerizing in aqueous emulsion a mixture of monomers including butadiene-1,3, p-chloro styrene and acrylonitrile, said mixture containing at least 50% by weight of butadiene-1,3.

3. The process which comprises polymerizing in aqueous emulsion a mixture of monomers consisting of about 50% by weight of butadiene-1,3, about 20% by weight of p-chloro styrene and about 30% by weight of acrylonitrile.

4. An elastic vulcanizable copolymer of a conjugated butadiene hydrocarbon, a compound of the formula $$Ar-C=CH_2$$
$$\vert$$
$$R$$

wherein Ar is a chlorinated aryl radical and R is a member of the class consisting of hydrogen and alkyl, and acrylonitrile.

5. An elastic vulcanizable copolymer of butadiene-1,3, p-chloro styrene and acrylonitrile.

DAVID CRAIG.